United States Patent [19]
Balch

[11] Patent Number: 5,618,134
[45] Date of Patent: Apr. 8, 1997

[54] SELF-REFRIGERATION KEEL-TYPE FOUNDATION SYSTEM

[76] Inventor: Joseph C. Balch, 7665 Balch Way, Salcha, Ak. 99714

[21] Appl. No.: 517,982

[22] Filed: Aug. 22, 1995

[51] Int. Cl.$^6$ .............................. E02D 19/14; F25D 23/12
[52] U.S. Cl. .............................. 405/130; 62/260; 165/45; 405/229
[58] Field of Search .................................. 405/229, 130; 62/259, 260

[56] References Cited

U.S. PATENT DOCUMENTS

| | | | |
|---|---|---|---|
| 3,220,470 | 11/1965 | Balch | 405/130 X |
| 3,472,314 | 10/1969 | Balch | 165/104.19 |
| 3,791,443 | 2/1974 | Burt et al. | 405/229 X |
| 4,344,414 | 8/1982 | Balch | 126/638 |
| 4,632,604 | 12/1986 | McKelvy | 165/45 X |

Primary Examiner—Tamara L. Graysay
Assistant Examiner—Tara L. Mayo
Attorney, Agent, or Firm—John R. Flanagan

[57] ABSTRACT

A self-refrigeration keel-type foundation system for supporting a structure, such as a building floor slab, hot or cold pipelines, bridging foundation and the like, above a permafrost earth strata located below the ground includes at least one and preferably a pair of elongated hollow containers underlying the structure, a load bearing assembly mounted on the upper sides of the containers for supporting the structure in a spaced relation above the containers, and a passive arrangement for transferring heat to the atmosphere above the ground via a heat exchanger unit located above the ground in substantial contact with the atmosphere, from the region of the permafrost earth strata adjacent to and supporting the containers via a natural thermal-siphon flow of refrigerant fluid in a refrigerant flow circuit extending through the containers and heat exchange unit and extending therebetween to thereby maintain the permafrost earth strata in a frozen condition.

22 Claims, 3 Drawing Sheets

5,618,134

SELF-REFRIGERATION KEEL-TYPE FOUNDATION SYSTEM

BACKGROUND OF THE INVENTION

1. Field of the Invention

The present invention generally relates to foundation systems utilized in construction and, more particularly, is concerned with a self-refrigerated foundation system for use in construction in permafrost zones.

2. Description of the Prior Art

Construction in permafrost zones throughout the world presents many unique difficulties not encountered in more temperate climates. During most of the year, the ground remains frozen solid providing solid support for structures. However, during the warmer summer months, the upper layer of soil may thaw. Also, if the structure is heated, heat radiating or conducting from the foundation of the structure can cause the upper layer of soil to thaw at any time of the year. When the ground thaws, the foundation loses the stability provided by frozen permafrost. This can cause the foundation to sink into the ground, often unevenly, resulting in substantial structural damage.

Various foundation systems are used to overcome the difficulties encountered in permafrost zones. One foundation system incorporates pilings that are placed deep into the ground. Installing pilings requires specialized equipment for boring piling holes and is therefore particularly expensive and time-consuming. Another foundation system utilizes an insulated pad beneath the structure. Insulated pads present two major drawbacks. A substantial amount of material must be hauled to the building site in order to construct the insulated pad, particularly if the structure is fairly large, and an insulated pad primarily addresses the problem of thawing due to radiated heat but ignores thawing that can occur during the warmer summer months. A third foundation system commonly employed is the refrigerated foundation system. Such foundation systems are designed to remove heat from the ground surrounding the foundation, thereby keeping the ground from thawing. Refrigerated foundation systems do not require the boring of deep holes and overcome both the problems of thawing due to heat radiated from the building and thawing during warmer summer months. However, prior known refrigerated foundations rely on active mechanical refrigeration units and are therefore expensive to construct, and because they require the input of energy to drive the active refrigeration units, they are fairly expensive to operate.

Consequently, a need still exists for a foundation system for use in construction in permafrost zones throughout the world that overcomes the problems of thawing during the warmer summer months and thawing due to radiated heat, is relatively inexpensive and simple to construct, and costs very little to operate.

SUMMARY OF THE INVENTION

The present invention provides a self-refrigeration keel-type foundation system designed to satisfy the aforementioned needs by avoiding the drawbacks of the prior art without introducing other drawbacks. The self-refrigeration keel-type foundation system of the present invention is a passive system for supporting various types of structures, such as a building floor slab, hot or cold pipelines, bridging foundations and the like, above a permafrost earth strata located below the ground. The self-refrigeration keel-type foundation system of the present invention basically includes: (a) at least one and preferably a pair of elongated hollow containers underlying the structure; (b) a load bearing assembly mounted on the upper sides of the containers for supporting the structure in a spaced relation above the containers; and (c) an arrangement for transferring heat from the region of the permafrost earth strata adjacent to and supporting the containers to the atmosphere, the heat transferring arrangement including a heat exchanger unit located in substantial contact with the atmosphere above the ground, a flow circuit extending through the containers and the heat exchanger unit and extending therebetween, and a quantity of refrigerant fluid in the flow circuit which via a natural thermal-siphon effect flows about the flow circuit to absorb heat from the permafrost earth region adjacent to the containers during flow through the containers and release heat to the atmosphere during flow through the heat exchanger unit to thereby maintain the permafrost earth strata region in a frozen condition.

One feature of the self-refrigeration keel-type foundation system of the present invention is a load bearing assembly associated with each of the containers which includes an elongated support beam extending longitudinally along and mounted upon the upper side of one of the containers, a support sill disposed above and extending longitudinally along one of the support beams, and a plurality of support members spaced apart from one another and mounted upon the support beam and supporting the support sill above the support beam. The structure rests on the support sills so that the structure is held above the containers without resting directly on the permafrost region. Preferably, the support members are support jacks, each being adjustable vertically in height independent of the other so that the structure may be maintained in a desired orientation, such as a level condition.

Another feature of the self-refrigeration keel-type foundation system of the present invention is a quantity of liquid, such as a brine solution, contained in each of the containers which will freeze at a temperature below that of water. The refrigerant fluid absorbs heat from the permafrost earth strata region adjacent to the containers via the liquid contained in the containers and flows by a natural thermal-siphon effect to release heat to the atmosphere via the heat exchange unit. The removal of heat from the permafrost earth strata region adjacent to the containers ensures that the permafrost earth strata is maintained as solid frozen ground capable of supporting the structure.

The primary advantages of the self-refrigeration keel-type foundation system of the present invention are that it is passive and low-cost and does not rely on an active mechanical refrigeration unit to maintain the permafrost in a solid frozen state. The refrigerant fluid flows by a natural thermal-siphon effect about the flow circuit to remove heat from the permafrost earth strata. Thus, once installed, there is no need for the input of costly energy in order to operate the heat transferring arrangement. And, since there are no moving parts, it costs very little to maintain the foundation system.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
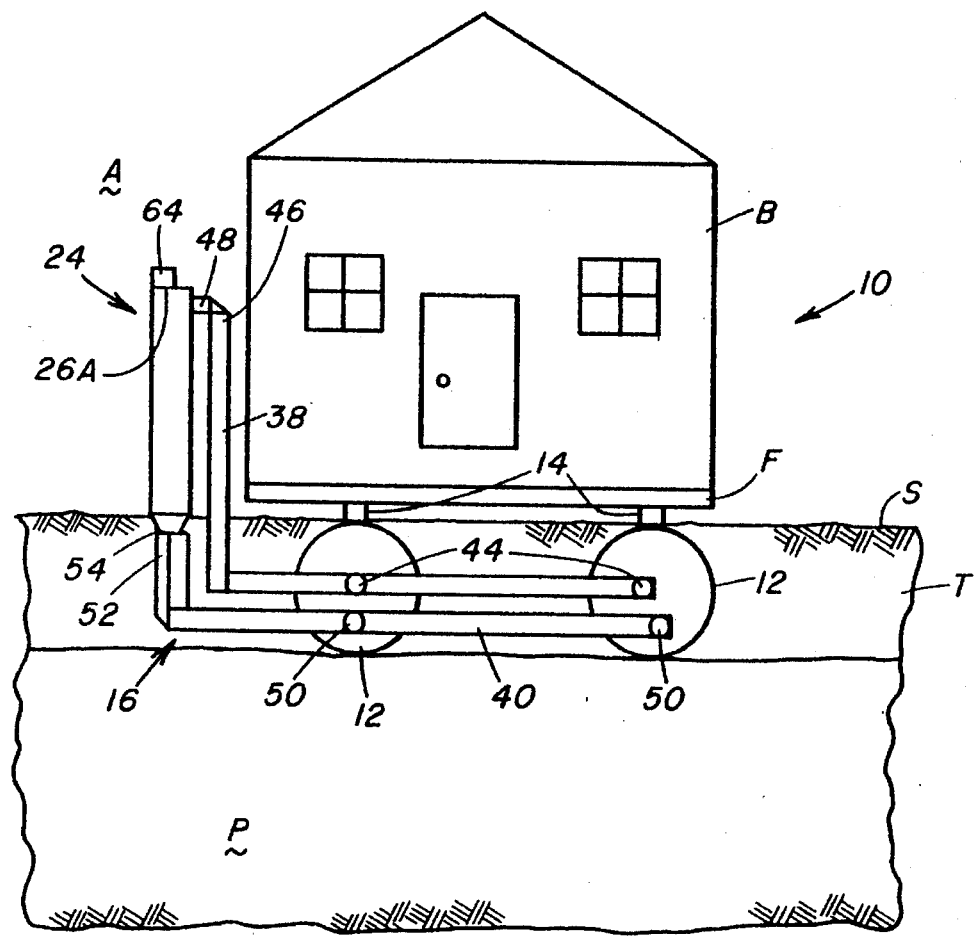
FIG. 1 is a diagrammatic side elevational view of a building structure supported by a self-refrigeration keel-type foundation system of the present invention.

Referring to the drawings, and particularly to FIG. 1, there is illustrated a self-refrigeration keel-type foundation system of the present invention, generally designated 10. The self-refrigeration keel-type foundation system 10, for the sake of brevity hereafter referred to as the "foundation system", is adapted for supporting a structure, such as a building B having a floor slab F, above a permafrost earth strata P located below the tundra or ground surface S. The foundation system 10 can also be applied for supporting other types of structures as well. Some examples of such structures are hot or cold pipelines and bridging foundations.

Figure 3:
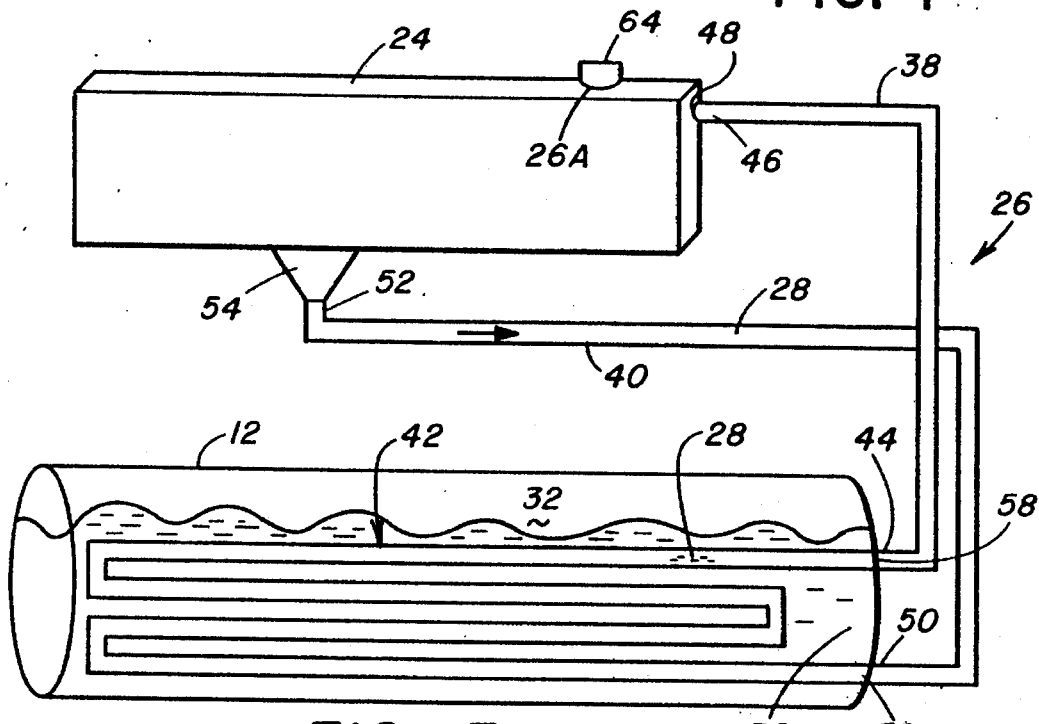
FIG. 3 is a diagrammatic side elevational view of a heat transferring arrangement of the self-refrigeration keel-type foundation system.
Figure 2:
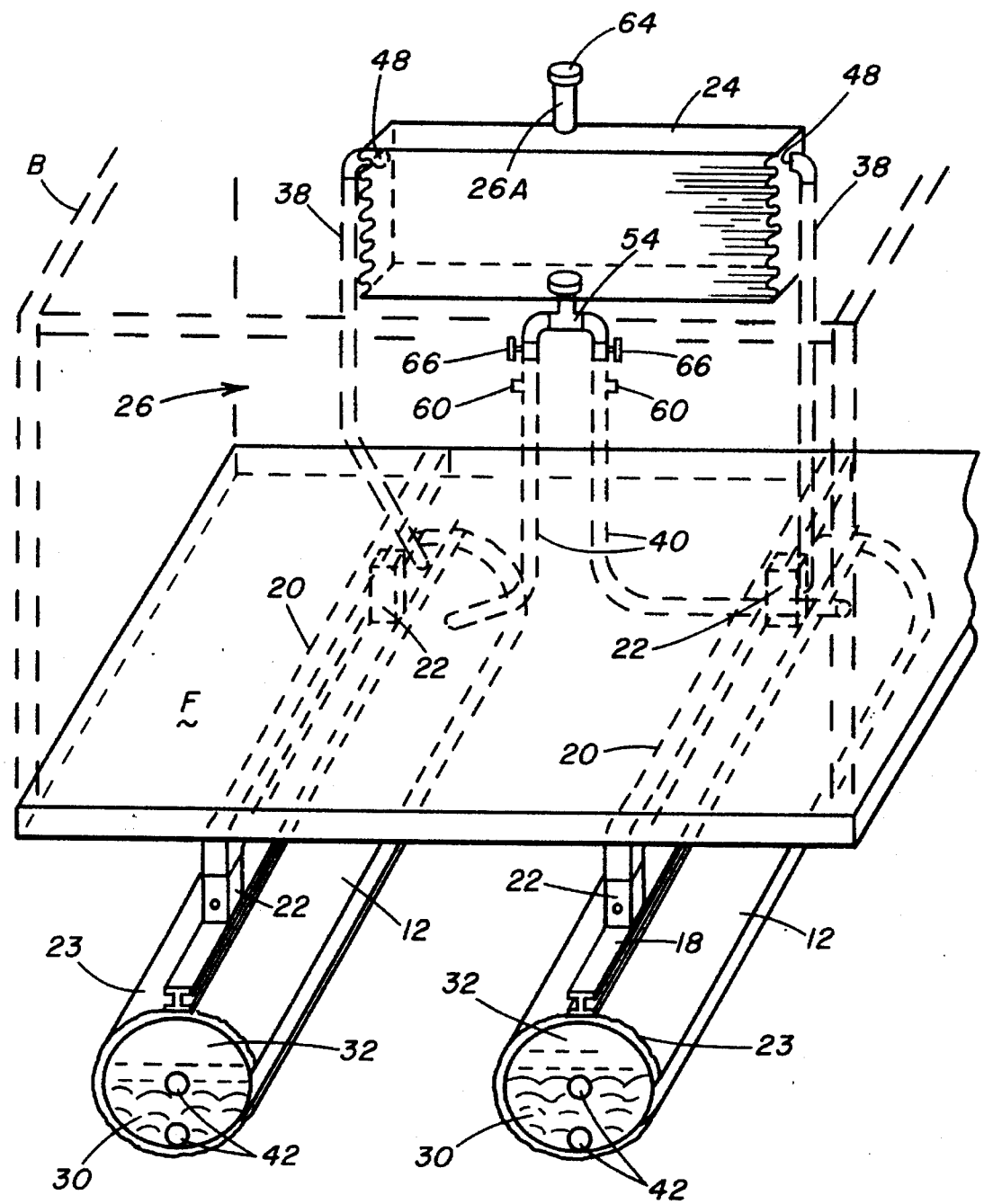
FIG. 2 is a perspective view of a floor slab of the building structure and the self-refrigeration keel-type foundation system supporting the slab.

Referring to FIGS. 1–3, the foundation system 10 basically includes one or more elongated hollow containers 12 spaced laterally from one another and underlying the floor slab F of the building structure B, a load bearing assembly 14 mounted on an upper side of each of the containers 12 and supporting the floor slab F in a spaced relation above the containers 12, and a heat transferring arrangement 16 which absorbs heat from a region of the permafrost earth strata P adjacent to the containers 12 and releases the heat to the atmosphere A above the ground surface S. The heat transferring arrangement 16 passively transfers the heat from below to above the ground surface S by the action of a natural thermal-siphon effect to thereby maintain the region of the permafrost strata S surrounding the containers 12 and underlying the foundation in a substantially frozen condition. The containers 12 are preferably cylindrical in shape although their shapes are not so limited. Also, the containers 12 may rest substantially upon the tundra or ground surface S, although, preferably, the top strata T of the tundra is excavated and the containers 12 are placed below the ground surface S and contact and are supported on the permafrost earth strata P along their lower surfaces, as is shown in FIG. 1.

Referring to FIG. 2, the load bearing assembly 14 mounted on the upper side of a respective one of the containers 12 supports the floor slab F in a spaced relation above the respective container 12. The load bearing assembly 14 includes an elongated support beam 18, an elongated support sill 20 and a plurality of support members 22. The elongated support beam 18 extends longitudinally and rests upon the upper side of the respective one container 12. At least a pair of the support members 22 are spaced apart from one another and mounted upon the opposite ends of the support beam 18. The support members 22 support the elongated support sill 20 above and in spaced relation to the support beam 18. The support sill 20 underlies and contacts the underside of the floor slab F. Preferably, the support members 22 are conventional support jacks (which are only illustrated in diagrammatic form) that are adjustable vertically in height independent of one another to maintain the floor slab F in a level condition.

Figure 4:
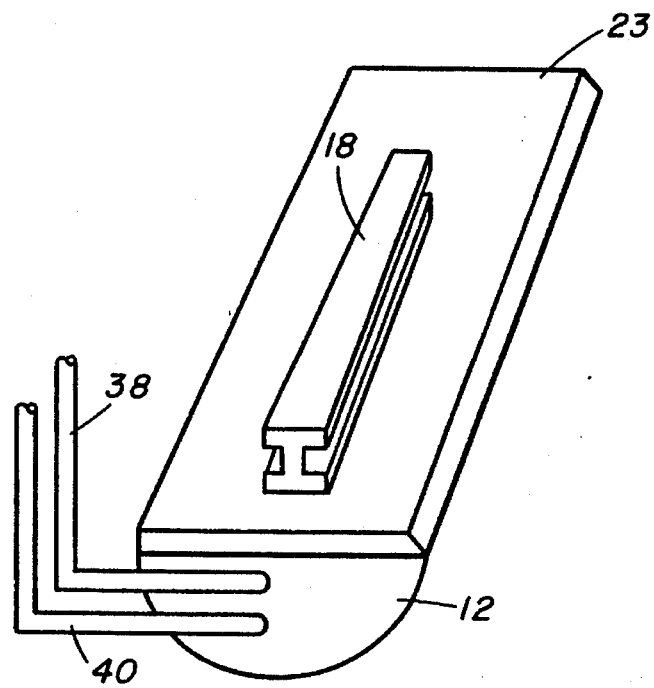
FIG. 4 is a perspective view of one of the containers of the self-refrigeration keel-type foundation system.

Referring to FIG. 4, the foundation system 10 can include a layer of external insulating material 23, such as in the form of a flat rigid panel, disposed about an upper portion of the outer surface of each container 12. As shown in FIG. 4, each container 12 may have a flat, as opposed to a rounded, upper portion and the external insulating material 23 may be disposed thereon underlying the support beam 18. The provision of the layers of external insulating material 23 serves to block conduction of heat downwardly from the floor slab F of the building structure B to the containers 12.

Referring again to FIGS. 1–3, the heat transferring arrangement 16 of the foundation system 10, which is passive in construction, includes a heat exchanger unit 24 located above the ground surface S in substantial contact with the atmosphere A, a flow circuit 26 extending through each of the containers 12 and the heat exchanger unit 24 and also extending therebetween, and a quantity of refrigerant fluid 28 contained in the flow circuit 26. The refrigerant fluid 28, via a natural thermal-siphon effect due the construction of the flow circuit 26, flows through and about the flow circuit 26 so as to absorb heat from the region of the permafrost earth strata P adjacent to the containers 12 during flow of the refrigerant fluid 28 through the containers 12 and so as to release heat to the atmosphere during flow of the refrigerant fluid 28 through the heat exchanger unit 24 to thereby in such manner maintain the region of the permafrost earth strata P in the frozen condition.

Also, as seen in FIGS. 2 and 3, each of the hollow container 12 preferably holds a quantity of a liquid 30, such as a brine solution, which has a freezing point below that of water. Preferably, the brine solution 30 does not completely fill the container 12 and an internal layer of insulating material 32 is disposed between the upper surface of the brine solution 30 and the internal upper surface of the container 12. The internal insulating material 32 may be flat panel of insulating material, blown pieces of insulating material or a floating form of insulating material that floats on the upper surface of the brine solution 30.

Figure 5:
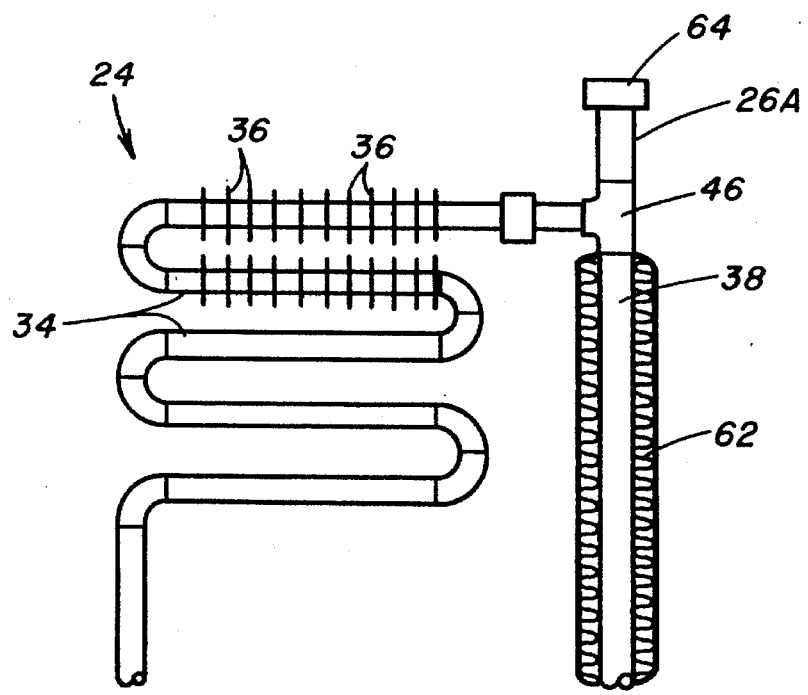
FIG. 5 is a side elevational view of a first flow line connected to an alternative embodiment of a heat exchange unit of a self-refrigeration keel-type foundation system.

As mentioned above, the heat exchange unit 24 is disposed above the ground surface S of the permafrost earth strata P and in substantial contact with the atmosphere A. Preferably, the heat exchange unit 24 is disposed on the side of the building structure B that minimizes its exposure to the sun, for example on the north side of a building constructed in the Alaska. Minimizing the exposure of the heat exchange unit 24 to the sun enhances the effectiveness of the heat transferring arrangement 16. The heat exchange unit 24 may have several configurations. As shown in FIGS. 1–3, the heat exchange unit 24 may be in the form of a rectangular tank constructed from corrugated material. Alternatively, as shown in FIG. 5, the heat exchange unit 24 may be formed of a length of tubing 34 having a plurality of external fins 36 extending radially outward from the outer surface of the tubing 34.

Referring to FIGS. 2 and 3, as mentioned above, the refrigerant flow circuit 26 extends through each of the hollow containers 12 and is connected to the heat exchange unit 24. In FIG. 3, the flow circuit 26 is shown associated with only one of the containers 12, while in FIG. 2 it is shown with both containers 12. The flow circuit 26 includes a first flow line 38 and a second flow line 40, and a heat transfer line 42 in each of the containers 12. The first flow line 38 has inlets 44 disposed at each of the containers 12 and extends therefrom to an outlet 46 that is connected to an inlet 48 on the heat exchange unit 24. The second flow line 40 has outlets 50 disposed at each of the container 12 and extends therefrom to an inlet 52 that is connected to an outlet 54 on the heat exchange unit 24. The outlet 54 on the heat exchange unit 24 is located below the inlet 48 on the heat exchange unit 24 so that the first flow line 38 is connected to the heat exchange unit 24 above the point at which the second flow line 40 is connected to the heat exchange unit 24. The heat transfer line 42 is disposed substantially within the brine solution 30 contained within the container 12 and is connected at one end 56 to the outlet 50 of the second flow line 50 and at an opposite other end 58 to the inlet 44 of the first flow line 38.

The refrigerant fluid 28 is contained within the heat exchange unit 24, the heat transfer lines 42, and the first and second flow lines 38, 40. As long as the ambient air temperature is colder than the brine solution temperature, the refrigerant fluid 28 flows about the flow circuit 26 and through the containers 12 and heat exchanger 24 in the directions of the arrows in FIG. 3 due to the aforementioned natural thermal-siphon effect caused by the expansion of the portions of the refrigerant fluid 28 that are absorbing heat in the heat transfer line 42 of the flow circuit 26 and the contraction of the portions of the refrigerant fluid 28 that are releasing heat in the heat exchange unit 24. Cooled refrigerant fluid 28 flows from the heat exchange unit 24 through the second flow line 40 to the heat transfer line 42. In the heat transfer line 42, the refrigerant fluid 28 absorbs heat from the permafrost earth strata P via the brine solution 30 in the container 12. Warmed refrigerant fluid 28 flows from the heat transfer line 42 through the first flow line 38 back to the heat exchange unit 24. In the heat exchange unit 24 the warmed refrigerant fluid 28 releases heat to the atmosphere A thereby becoming cooled refrigerant fluid 28 that flows through the second flow line 40 to the heat transfer line 42 in the containers 12 where it again absorbs heat from the permafrost earth strata P. Thus, by flowing in a continuous cycle, the refrigerant fluid 28 transfers heat from the permafrost earth strata P to the atmosphere A. However, when the ambient air temperature is hotter than the brine solution temperature, all refrigerant fluid flow and thus heat flow will cease, with the exception that if the frozen permafrost strata starts to warm up its heat is absorbed into the brine solution preventing the permafrost strata from thawing.

Preferably, the refrigerant flow circuit 26 can include several additional features. When it is very warm, the natural thermal-siphon effect may not be capable of removing enough heat from the permafrost earth strata P to keep it in a frozen condition. Thus, as shown in FIG. 2, taps 60 are provided for attachment of a mechanical refrigeration unit (not illustrated) in the refrigerant flow circuit 26 so that the heat transferring arrangement 16 may be supplemented during very warm periods. Additionally, as shown in FIG. 5, there is a layer of external insulating material 62 disposed about the first flow line 38 to prevent the refrigerant fluid 28 from cooling too much in the first flow line 38 before it reaches the heat exchange unit 26. Further, there is a filler cap 64 mounted on a top surface of the heat exchange unit 24, as shown in FIGS. 2 and 3, or extending upward from of the top end of the first flow line 38, as shown in FIG. 5, so that an additional quantity of refrigerant fluid 28 may be introduced into the refrigerant flow circuit 26. As seen in FIG. 2, flow control valves 66 are provided second flow lines 40 adjacent to and above taps 60 to use as a temperature control aid or to stop fluid flow between the heat exchange unit 24 and the containers 12 during introduction of refrigerant fluid 28 into or repair and maintenance of the heat transfer arrangement 16. Finally, the portion 26A of the refrigerant flow circuit 26 leading to the filler cap 64 constitutes an expansion and contraction reservoir in the refrigerant flow circuit 26 to allow for expansion or contraction of the refrigerant fluid 28.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A self-refrigeration keel-type foundation system for supporting a structure above a permafrost earth strata located below the ground, said system comprising:

(a) at least one elongated hollow container underlying a structure and disposed substantially below ground and supported substantially on a permafrost earth strata;

(b) a load bearing assembly mounted on an upper side of said at least one container for supporting the structure in a spaced relation above said at least one containers; and (c) a heat transferring arrangement for absorbing heat from a region of the permafrost earth strata adjacent to said at least one container, transferring heat by a natural thermal-siphon effect from below to above the ground, and releasing heat to the atmosphere above the ground to thereby maintain the permafrost earth strata in a substantially frozen condition.

2. The system of claim 1 further comprising:

(d) a quantity of liquid contained in said at least one container having a freezing point below that of water.

3. The system of claim 2 wherein said liquid is a brine solution.

4. The system of claim 2 further comprising:

(d) an internal layer of insulating material disposed within said at least one container between an upper surface of said quantity of liquid therein and an internal upper surface of said at least one container.

5. The system of claim 1 further comprising:

(d) an external layer of insulating material disposed outside of and about any portion of an outer surface of said at least one container that is above ground surface.

6. The system of claim 1 wherein said load bearing assembly includes an elongated support beam extending longitudinally along and mounted upon said upper side of said at least one container and disposed below the structure.

7. The system of claim 6 wherein said load bearing assembly also includes:

an elongated support sill disposed above and extending longitudinally along said support beam and below and supporting the structure; and a plurality of support members spaced apart from one another and mounted upon said support beam and supporting said support sill above said support beam so as to underlie and support the structure in a spaced relation above said at least one container.

8. The system of claim 7 wherein said support members are support jacks, each said support jack being adjustable vertically in height independent of the other to maintain the structure in a desired orientation.

9. The system of claim 1 wherein said heat transferring arrangement includes:

a heat exchanger unit located in substantial contact with the atmosphere above the ground surface;

a flow circuit extending through said at least one container and said heat exchanger unit and extending therebetween; and a quantity of refrigerant fluid in said flow circuit which via the natural thermal-siphon effect is caused to flow about said flow circuit and to absorb heat from the permafrost earth region adjacent to said at least one container during flow through said container, transfer heat from below to above the ground surface, and release heat to the atmosphere during flow through said heat exchanger unit to thereby maintain the permafrost earth strata region in the frozen condition.

10. The system of claim 9 wherein said flow circuit includes:

a first flow line extending between said at least one container and said heat exchanger unit, said first flow line having an inlet connected to an outlet on said at least one container and an outlet connected to an inlet on an upper end of said heat exchanger unit; and a second flow line extending between said at least one container and said heat exchanger unit, said second flow line having an outlet connected to an inlet on said at least one container and an inlet connected to an outlet on a lower end of said heat exchanger unit being located below said inlet thereof.

11. The system of claim 10 wherein said flow circuit also includes a heat transfer line disposed in said at least one container substantially within a quantity of liquid contained therein and extending between opposite ends of said at least one container, one end of said heat transfer line being connected to said outlet of said second flow line and an opposite other end of said heat transfer line being connected to said inlet of said first flow line.

12. A self-refrigeration keel-type foundation system for supporting a structure above a permafrost earth strata located below the ground, said system comprising:

(a) a pair of elongated hollow containers laterally spaced apart from one another for underlying a structure and being disposed substantially below ground and supported substantially on a permafrost earth strata;

(b) a load bearing assembly mounted on an upper side of each of said containers for supporting the structure in a spaced relation above said containers; and (c) a heat transferring arrangement for absorbing heat from a region of the permafrost earth strata adjacent to said containers, transferring heat by a natural thermal-siphon effect from below to above the ground, and releasing heat to the atmosphere above the ground to thereby maintain the permafrost earth strata in a substantially frozen condition.

13. The system of claim 12 further comprising:

(d) a quantity of liquid contained in each of said containers having a freezing point below that of water.

14. The system of claim 13 wherein said liquid is a brine solution.

15. The system of claim 13 further comprising:

(d) an internal layer of insulating material disposed within each of said containers between an upper surface of said quantity of liquid therein and an internal upper surface of each of said containers.

16. The system of claim 12 further comprising:

(d) an external layer of insulating material disposed outside of and about any portion of an outer surface of each of said containers that is above ground.

17. The system of claim 12 wherein said load bearing assembly includes an elongated support beam extending longitudinally along and mounted upon said upper side of a respective one of said containers and disposed below the structure.

18. The system of claim 17 wherein said load bearing assembly also includes:

an elongated support sill disposed above and extending longitudinally along said support beam and below and supporting the structure; and a plurality of support members spaced apart from one another and mounted upon said support beam and supporting said support sill above said support beam so as to underlie and support the structure in a spaced relation above said respective one container.

19. The system of claim 18 wherein said support members are support jacks, each said support jack being adjustable vertically in height independent of the other to maintain the structure in a desired orientation.

20. The system of claim 12 wherein said heat transferring arrangement includes:

a heat exchanger unit located in substantial contact with the atmosphere above the ground;

a flow circuit extending through said containers and said heat exchanger unit and extending therebetween; and a quantity of refrigerant fluid in said flow circuit which via the natural thermal-siphon effect is caused to flow about said flow circuit and to absorb heat from the permafrost earth region adjacent to said containers during flow through said containers, transfer heat from below to above the ground, and release heat to the atmosphere during flow through said heat exchanger unit to thereby maintain the permafrost earth strata region in the frozen condition.

21. The system of claim 20 wherein said flow circuit includes:

a first flow line extending between each of said containers and said heat exchanger unit, said first flow line having an inlet connected to an outlet on each of said containers and an outlet connected to an inlet on an upper end of said heat exchanger unit; and a second flow line extending between each of said containers and said heat exchanger unit, said second flow line having outlets connected to an inlet on each of said container and an inlet connected to an outlet on a lower end of said heat exchanger unit being located below said inlet thereof.

22. The system of claim 21 wherein said flow circuit also includes a heat transfer line disposed in each of said containers substantially within a quantity of liquid contained therein and extending between opposite ends of said respective container, one end of said heat transfer line being connected to said outlet of said second flow line and an opposite other end of said heat transfer line being connected to said inlet of said first flow line.

\* \* \* \* \*